US012801401B2

(12) United States Patent
Dunaif et al.

(10) Patent No.: US 12,801,401 B2
(45) Date of Patent: Nov. 17, 2026

(54) SYSTEMS AND METHODS FOR DECENTRALIZED MULTI-BLOCKCHAIN PROGRAM EXECUTION

(71) Applicant: HALLIDAY INTERNATIONAL, INC., San Francisco, CA (US)

(72) Inventors: Griffin Dunaif, San Francisco, CA (US); Jared Flatow, San Francisco, CA (US); Tanmaya Hada, San Francisco, CA (US); Ruei-Hung Alex Lee, San Francisco, CA (US)

(73) Assignee: HALLIDAY INTERNATIONAL, INC., San Francisco, CA (US)

( * ) Notice: Subject to any disclaimer, the term of this patent is extended or adjusted under 35 U.S.C. 154(b) by 3 days.

(21) Appl. No.: 19/543,190

(22) Filed: Feb. 18, 2026

(65) Prior Publication Data

US 2026/0244455 A1 Aug. 20, 2026

Related U.S. Application Data

(60) Provisional application No. 63/846,579, filed on Jul. 18, 2025, provisional application No. 63/760,456, filed on Feb. 19, 2025.

(51) Int. Cl.
*G06F 9/445* (2018.01)
*G06F 9/455* (2018.01)

(52) U.S. Cl.
CPC .......... *G06F 9/445* (2013.01); *G06F 9/45558* (2013.01); *G06F 2009/45583* (2013.01)

(58) Field of Classification Search
CPC ................. G06F 9/445; G06F 9/45558; G06F 2009/45583
USPC ................................................ 713/1, 2, 100
See application file for complete search history.

(56) References Cited

U.S. PATENT DOCUMENTS

2016/0378522 A1* 12/2016 Kaplan ............... G06F 12/1036 718/1
2021/0055948 A1* 2/2021 Tsirkin ................ G06F 9/45558
2024/0259465 A1* 8/2024 Duarte Cardoso ..... H04L 63/20

OTHER PUBLICATIONS

PCT/US2026/015648, "International Search Report and Written Opinion", Jul. 7, 2027, 11 pages.

(Continued)

*Primary Examiner* — Michael J Brown
(74) *Attorney, Agent, or Firm* — Kilpatrick Townsend & Stockton LLP

(57) ABSTRACT

In some examples, a system that can receive an intent declaration defining steps of a workflow to be performed across multiple blockchains. The system can initialize a user register space and a solver register space as separate memory regions of a virtual machine (VM), load first data and first execution logic specified in the intent declaration into the user register space, and load second data and second execution logic contributed by a solver in fulfillment of the one or more steps into the solver register space. The system can then execute an intent program corresponding to the intent declaration within a context of the VM. This can involve transitioning between a user mode and a solver mode based on a program context, where the user mode causes the VM to execute the first execution logic, and the solver mode causes the VM to execute the second execution logic.

20 Claims, 7 Drawing Sheets

(56) References Cited

OTHER PUBLICATIONS

Zhu et al. "Blockchain-Based Software Architecture Development for Service Requirements With Smart Contracts" vol. 54, No. 12. pp. 72-80. Nov. 19, 2021.
Momeni. "IBE-IBE: Intent-Based Execution through Identity-Based Encryption and Auctions", IACR International Association for Cryptologic Research. vol. 20250215:225228. pp. 1-17. Feb. 15, 2025.
Grossman et al. "Practical Verification of Smart Contracts using Memory Splitting" vol. 8. pp. 2402-2433. Oct. 8, 2024.

* cited by examiner

SYSTEMS AND METHODS FOR DECENTRALIZED MULTI-BLOCKCHAIN PROGRAM EXECUTION

CROSS-REFERENCE TO RELATED APPLICATIONS

This claims the benefit of priority under 35 U.S.C. § 119 (e) to U.S. Provisional Patent Application No. 63/760,456 filed Feb. 19, 2025, and to U.S. Provisional Patent Application No. 63/846,579, filed Jul. 18, 2025, the entirety of each of which is hereby incorporated by reference herein.

TECHNICAL FIELD

The present disclosure relates generally to blockchain operations executed by computer systems. More specifically, but not by way of limitation, this disclosure relates to systems and methods for decentralized multi-blockchain program execution.

BACKGROUND

Blockchain technology has emerged as a foundational innovation in distributed computing, enabling the creation of decentralized, tamper-resistant ledgers that record transactions and data in a transparent and secure manner. In a typical blockchain, information is grouped into blocks, each cryptographically linked to its predecessor, forming an immutable chain of records. This structure gives rise to a cryptographically-linked ledger, which serves as a distributed and auditable record of all transactions. The resulting architecture eliminates the need for centralized authorities and allows participants to reach consensus on the state of the ledger through various protocols. Blockchains have found widespread application across industries, powering digital currencies, smart contracts, decentralized finance (DeFi), and more. Smart contracts are computer programs stored on a blockchain (e.g., the underlying blockchain network) that are automatically executed when predetermined conditions are met, helping to ensure deterministic and transparent outcomes.

As blockchain adoption has grown, the ecosystem has diversified into a multitude of independent blockchains (often referred to as "chains"), each of which may have its own protocols, consensus mechanisms, and native assets. Chains may also differ in their transaction models, programmability, scalability, and security features. As a result, the broader blockchain landscape is characterized by a diversity of protocols and operational frameworks.

SUMMARY

One example of the present disclosure can include a non-transitory computer-readable medium storing program code that is executable by one or more processors for causing the one or more processors to perform operations. The operations can include receiving an intent declaration submitted by a user, wherein the intent declaration defines one or more steps of a workflow to be performed across multiple blockchains; initializing a user register space and a solver register space as separate memory regions of a virtual machine; loading first data and first execution logic specified in the intent declaration into the user register space; loading second data and second execution logic contributed by a solver in fulfillment of the one or more steps into the solver register space; and executing an intent program corresponding to the intent declaration within a context of the virtual machine, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

Another example of the present disclosure can include a system comprising a memory and a processor coupled to the memory, wherein the processor is configured to receive an intent declaration submitted by a user, and wherein the intent declaration defines one or more steps of a workflow to be performed across multiple blockchains. The system may further comprise a virtual machine associated with a blockchain of the multiple blockchains, wherein the virtual machine is configured to perform operations including: initializing a user register space and a solver register space as separate memory regions of the virtual machine; loading first data and first execution logic specified in the intent declaration into the user register space; loading second data and second execution logic contributed by a solver in fulfillment of the one or more steps into the solver register space; and executing an intent program corresponding to the intent declaration, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

Still another example of the present disclosure can include a method comprising: submitting, by a processor, a smart contract for execution in relation to a blockchain, wherein the smart contract is executable to cause a virtual machine associated with the blockchain to perform operations, the operations including: initializing a user register space and a solver register space as separate memory regions of a virtual machine; loading first data and first execution logic specified in an intent declaration into the user register space, wherein the intent declaration defines one or more steps of a workflow to be performed across multiple blockchains; loading second data and second execution logic contributed by a solver in fulfillment of the one or more steps into the solver register space; and executing an intent program corresponding to the intent declaration, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

DETAILED DESCRIPTION

Figure 1:
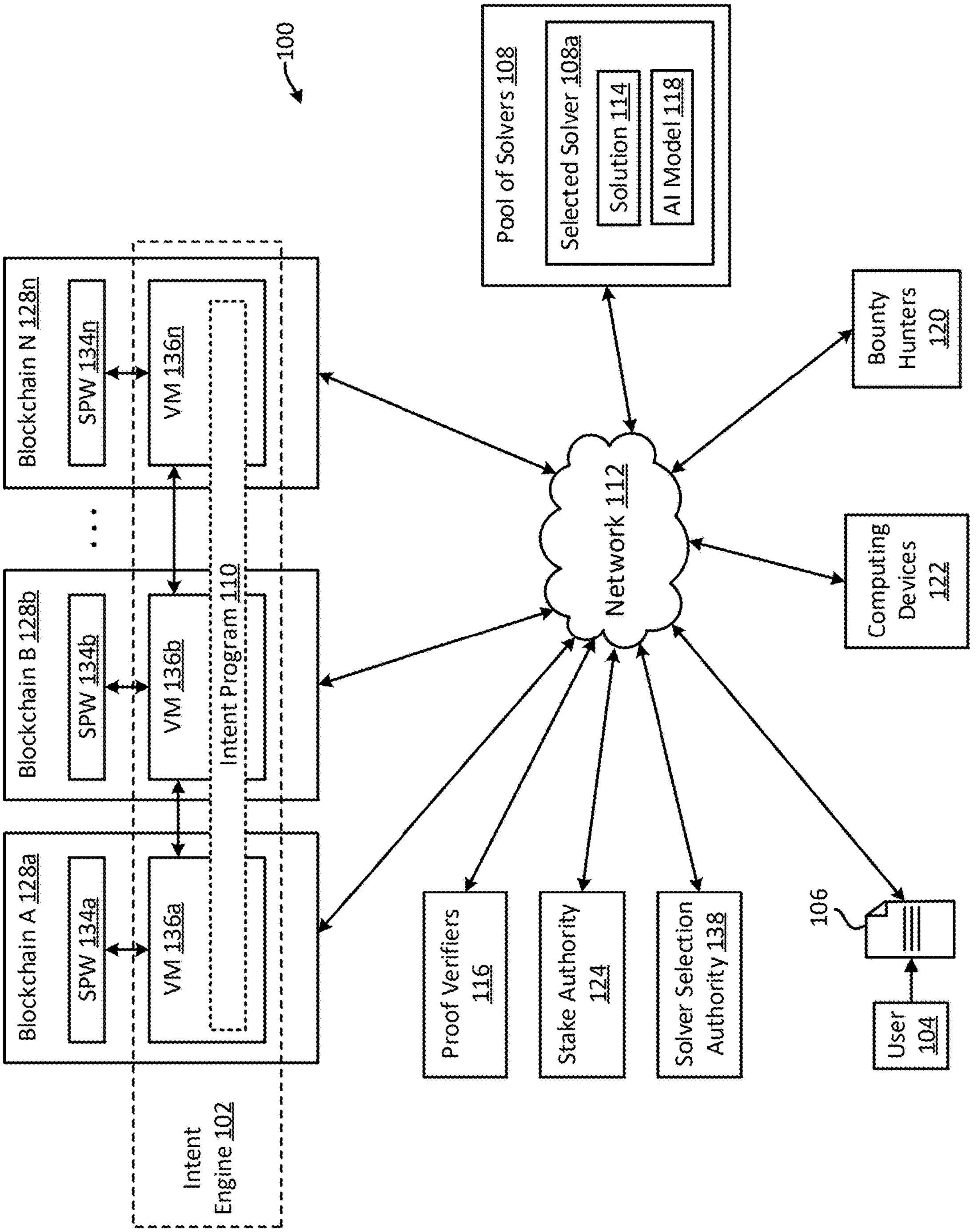
FIG. 1 shows an example of a system that can facilitate decentralized, intent-driven execution of complex workflows across one or more blockchains, according to some aspects of the present disclosure.

Blockchain technology has historically permitted only simple operations such as transferring tokens between addresses. However, the proliferation of blockchains and the diversification of their types have led to growing demand for more sophisticated operations. These complex operations often span multiple blockchains and require the execution of several steps under specific conditions. For example, a user aiming to onramp a particular token, such as DEST, onto a blockchain like BC3 may first need to onramp a different token (SRC) on a separate blockchain (BC1), bridge that token through an intermediate blockchain (BC2), and finally swap SRC for DEST on BC3. Executing such a workflow necessitates submitting multiple transactions across three different blockchains, consuming substantial time and processing resources. The manual coordination of these tasks is not only cumbersome and error-prone but also potentially infeasible for users with limited computational capacity, which can result in failed or improperly executed operations.

The present disclosure can overcome one or more of the abovementioned problems by providing a decentralized system that orchestrates the execution of complex blockchain operations as specified by intent declarations. Intent declarations can represent the explicit actions or desired outcomes that a user wishes to achieve when interacting with decentralized applications (dApps) and/or performing complex blockchain operations involving multiple blockchain operations. An intent declaration can be drafted in a declarative language (e.g., extensible Markup Language (XML), JavaScript Object Notation (JSON), Applicant Binary Interface (ABI) encodings, etc.) rather than a programming language (e.g., C++, Java, etc.) and represent a formalized statement of a user's desired outcome or workflow. A single intent declaration may encompass multiple steps and conditions that may span several blockchains. Rather than requiring users to manage each operation individually, intent declarations can allow users to articulate their objectives in terms of end results, which the system then interprets and executes. Intent declarations can serve two principal functions. First, they can simplify user interactions by abstracting the intricacies of multi-step, multi-chain processes into a single, high-level specification. Second, they can ensure that the system faithfully captures and executes the user's desired outcomes. The system can translate the intent declaration into a programmatic workflow, which can be executed in a secure, decentralized manner, thereby preserving the integrity and reliability of the user's objectives.

Users can submit intent declarations describing their desired workflows, which may include multiple steps and conditional dependencies. The system then solicits and receives requests from "solvers," who propose to perform the operations specified in the intent declaration on behalf of the user. After evaluating the solver candidates based on one or more factors, the system can select a solver to execute the workflow defined by the intent declaration. Upon completion, the solver can provide proof of execution, such as the relevant blockchain details, transaction hashes, and solution identifiers. The system can then verify the accuracy of this proof, potentially using "bounty hunters" that can automatically detect and prove any fraudulent or incorrect execution. This architecture enables a clear separation between the process of writing intent declarations (by users) and the process of executing them (by solvers), improving modularity and enabling specialization in both roles.

By abstracting user interactions and automating the execution of multi-step workflows, the system directly addresses the technical challenges inherent in complex blockchain operations. Users are no longer burdened with submitting multiple transactions to multiple blockchains, thereby significantly reducing the time and computational resources required for these operations. The system's verification mechanisms can help ensure that solvers execute the workflows as specified, instilling confidence that the user's intent is faithfully realized. The modular separation between declaration and execution roles allows users to focus solely on their goals, while solvers optimize execution. This structure also facilitates the dynamic selection of solvers best suited to each workflow, further enhancing the reliability and efficiency of the process. This can bridge the gap between user expectations and system performance, ensuring that the intents are not only captured but also executed in a manner that aligns closely with the user's specified outcomes.

In some examples, the system can provide an intent engine that includes multiple virtual machines spanning multiple blockchains, which can execute the intent program defined by the intent declaration. The virtual machines can support various operations, such as calling and delegating to other blockchain programs, storing values in registers, and constructing conditional logic and constraints based on the values stored in those registers. Solvers can respond with compatible solutions using the same language. In some examples, the system can also provide user interfaces (e.g., dashboards) to help users write or define intent declarations, and may incorporate large language models (LLMs) to generate intent declarations from user-provided text.

A single intent declaration may include any number of steps and any type of steps. As a result, the intent declaration may include or specify an entire workflow (e.g., using an opcode schema). In this manner, the user may define a workflow on one or more blockchains with the opcode schema or code that is associated with the opcode schema. These workflows may be asynchronous and may operate on multiple blockchains, which allows a single intent declaration to operate on or cover multiple blockchains. Some workflows may be recurring, and one or more solvers may perform multiple iterations of those workflows.

In some examples, the system can also allow users to leave gaps (e.g., unfilled fields) in their intent declarations. Solvers can subsequently fill those gaps with additional steps or instructions, subject to user-defined constraints. The user-defined constraints may place limitations on the steps or instructions that the solver adds to the intent. This flexible approach enables collaborative construction of complex workflows while maintaining user control over the permissible scope of solver actions.

The protocol architecture described herein yields concrete technical improvements over conventional blockchain approaches by leveraging dedicated components and workflow abstractions to enhance processing efficiency, memory utilization, and operational speed. The use of intent declarations, interpreted and executed by the protocol's virtual machines, enables complex, multi-step workflows to be represented as compact, declarative programs rather than long sequences of discrete transactions. This reduces the computational burden on validators and participating nodes, as program logic can be processed and validated in fewer, more atomic on-chain operations. The single program wallet (SPW) can further enhance memory efficiency by encapsulating workflow-specific state and asset custody within a purpose-built contract, allowing only necessary execution data and step mappings to be persisted, while intermediate or redundant state is omitted from the blockchain's global ledger. By orchestrating the execution of workflow steps, managing dependencies, and coordinating state transitions within the protocol's modular architecture, the system can minimize cross-contract polling and repetitive data retrieval, reducing both memory footprint and network bandwidth. These optimizations, combined with the ability to parallelize independent steps and batch updates across chains, can improve the speed at which complex workflows are completed, thereby enabling faster end-to-end execution compared to traditional, transaction-by-transaction blockchain operations.

This introduction describes the general subject matter discussed herein and is not intended to limit the scope of the disclosed concepts. The following sections describe various additional features and examples with reference to the drawings in which like numerals indicate like elements but, like the illustrative examples, should not be used to limit the present disclosure.

FIG. 1 shows an example of a system 100 that can facilitate decentralized, intent-driven execution of complex workflows across multiple blockchains 128*a-n*, according to some aspects of the present disclosure. It will be appreciated that the blockchains 128*a-n* are each implemented by a respective distributed network of computing nodes, referred to as a "blockchain network." The blockchain network for a given blockchain may implement consensus protocols and other mechanisms that facilitate the security, reliability, and continuity of the blockchain. The blockchain network can be responsible for validating transactions, maintaining the shared ledger, and executing smart contracts as specified by protocol rules. Accordingly, references to a "blockchain" within this disclosure may in some cases be shorthand intended to mean the underlying blockchain network that runs the referenced blockchain, as would be understood by one of ordinary skill in the art.

The system 100 includes a user 104 that can create an intent declaration 106. Examples of the user 104 may include a human user, a software application, or a software agent. The user 104 may utilize a dashboard, a graphical user interface, an application programming interface, a large language model (LLM)-based frontend, or other mechanisms to create the intent declaration 106. The intent declaration 106 can specify one or more desired outcomes, constraints, dynamic or static parameters, and program steps to be performed on the blockchains 128*a-n*. The intent declaration 106 may encompass one or more steps, each corresponding to operations on one or more blockchains 128, and may include templates or "gaps" designed to be filled by solvers 108 at execution time. The intent declaration 106 can also reference external contracts, specify constraints, and/or encode user preferences or requirements.

The user 104 can submit the intent declaration 106 to the system 100. For example, the user 104 can operate a computing device (e.g., computing device 122) to submit the intent declaration 106 to the system 100. Examples of the computing device can include a laptop computer, desktop computer, Internet of Things (IoT) device, smartphone, or tablet. The intent declaration 106 can be submitted to the system 100 by calling an intent engine function or code. Alternatively, the system 100 can include user interfaces such as application programming interfaces (APIs) or endpoints through which the user 104 can submit the intent declaration 106 to the system 100.

The system 100 can receive the intent declaration 106 from the user 104 and responsively trigger a solver selection process. The solver selection process can be performed by a solver selection authority 138. The solver selection authority 138 can be a smart contract (e.g., executed on a blockchain such as blockchain 128*a*) or another programmatic entity such as a software agent. The solver selection process involves selecting a solver 108*a* from among a pool of solvers 108 for executing at least one iteration of an intent program 110 defined by the intent declaration 106. A solver can be a smart contract (e.g., executed on a blockchain such as blockchain 128*a*) or another programmatic entity such as a software agent. The selected solver 108*a* can be configured to satisfy the intent declaration 106 in exchange for consideration. The selected solver 108*a* can satisfy the intent declaration 106 by driving the execution of the intent program 110 associated with the intent declaration 106.

During the solver selection process, the solver selection authority 138 may receive requests from a pool of solvers 108, which can include one or more individual solvers. These requests can be recorded on a blockchain (e.g., blockchain 128*a*) that is operatively associated with an intent engine 102, as described in greater detail below. The solver selection authority 138 can evaluate and select a solver 108*a* from among the pool of solvers 108, based on one or more selection factors. These factors may include protocol-defined criteria and/or user-defined criteria. User-defined criteria may be provided by the user 104 within the intent declaration 106. The selection factors may include, for example, the solver's capabilities, historical performance metrics, and requested compensation. For example, the solver selection authority 138 may assess the pool of solvers 108 based on their documented historical performance and/or the compensation each solver requests, and select a particular solver 108*a* whose attributes meet or exceed one or more predefined conditions. Once a solver 108*a* is chosen, the solver selection authority 138 may authorize the selected solver 108*a* to submit solutions 114 and may digitally sign the request submitted by the solver 108*a*, thereby generating an authorized intent declaration request. The duration of the solver selection process may be governed by time constraints specified in the intent declaration 106, allowing the process to remain flexible and adaptable to different operational requirements.

The system 100 may support several solver models, such as operator solves (where an operator of the system 100 also serves as the solver 108*a*), partners solve (a group of partners may be selected to operate as solvers), and/or anyone-can-solve models (where staking and proofs are more important, and any properly staked solver may participate and bid). In the "operator solves" implementation, the solver selection authority 138 may generally be set to an address controlled by the operator. Intent declarations are then submitted out-of-band to the operator to initiate action by a self-assigned solver, thereby effectively avoiding the solver selection process. There may also be an anyone-can-solve decentralized implementation, in which the system 100 relinquishes control over the solver selection process to a decentralized mechanism.

Since the solver selection authority 138 can determine the solver 108*a* for at least one intent program iteration, the solver selection authority 138 may also ensure that the chosen solver 108*a* is sufficiently staked with a stake authority 124 for some or all of a verification window. The stake authority 124 can be a smart contract (e.g., executed on a blockchain such as blockchain 128*a*) or another programmatic entity such as a software agent. The verification window can be a window of time for which the selected solver 108*a* may have its stake locked with the stake authority 124 to participate in solving intent programs. The selected solver 108*a* may be required to "stake" a value, which would be locked within the stake authority 124 for the duration of the verification window. The stake may be enough to cover the insurance (which may depend on the input+fees) and/or a protocol fee (which may include fees paid to provers such as a bounty hunter 120). The stake may prevent the selected solver 108*a* from removing the staked value. The solver selection authority 138 may communicate with the stake authority 124 to verify that the selected solver 108*a* is sufficiently staked with the stake authority 124. The stake authority 124 can hold assets in escrow, process staking operations (e.g., deposit and unlock), and/or enforce protocol rules for insurance, fees, and/or bounty payments to bounty hunters 120. The solver selection authority 138 may have the ability to lock solver stakes with the stake authority 124, and a proof verifier 116 may be authorized to unlock and/or slash stakes with the stake authority 124 based on predefined rules.

Once a solver 108*a* is selected, the solver 108*a* can interface with an intent engine 102 to execute the steps of the intent program 110 associated with the intent declaration 106 on the relevant blockchains 128. The intent engine 102 can be a collection of virtual machines 136*a-n* running across some or all of the blockchains 128*a-n*. A virtual machine is a software-based emulation of a physical computer, typically deployed as a "guest" on a host machine. A virtual machine may include a virtual central processing units (vCPU), virtual random access memory (vRAM), a virtual network interface, and a virtual storage. The collection of virtual machines 136*a-n* can be associated with a collection of smart contracts on the blockchains 128*a-n*. For example, the collection of smart contracts may be configured to deploy the virtual machines 136*a-n* of the intent engine 102 on the blockchains 128*a-n*. The virtual machines 136*a-n* can interact with each other to individually or collectively enforce intent program constraints and provide execution guarantees to the user 104 and/or the selected solver 108*a*.

The virtual machines 136*a-n* can each operate on a corresponding one of the blockchains 128*a-n*. For example, virtual machine 136*a* can operate on blockchain 128*a*, virtual machine 136*b* can operate on blockchain 128*b*, etc. The virtual machines 136*a-n* are responsible for interpreting and executing the actual instructions associated with the steps of the intent program 110. The operation of the virtual machines 136*a-n* may be opaque to the high-level protocol, however the interface may be described by the protocol, and each VM may have a specification of its behavior.

The intent program 110 can be a distributed program that is executed by the intent engine 102 via a set of steps defined by the intent declaration 106. The intent program 110 can have an "owner," which often is the user 104, but any other owner can be specified in the intent declaration 106. Ownership of the intent program 110 may be transferred via, for example, a token interface external to the protocol and defined elsewhere. The owner of the intent program 110 may be expected to supply missing input funds to the intent program 110.

In an "operator solves" implementation, the user 104 may construct the intent declaration 106 with the help of the operator and may be prompted to deposit initial funds into a single program wallet 134*a*, as described in greater detail below, on a blockchain such as blockchain 128*a* prior to the execution of the intent declaration 106. The operator may then implicitly create the single program wallet 134*a* to hold the funds when the operator solves the first step of the intent program 110 on each blockchain.

In some examples, the selected solver 108*a* may seek to guarantee its exclusive rights to the fee allocated for the solution 114 of a particular iteration/instance of solving the intent program 110 by calling on the single program wallet 134*a* associated with the intent program 110, after the solver 108*a* has been authorized by the solver selection authority 138. In response to being called on for such a guarantee, the single program wallet 134*a* can store the solver's identity on the blockchain 128*a* and the solver 108*a* can become the only entity capable of claiming the fee, unless the solver 108*a* chooses to forfeit that right.

The selected solver 108*a* can begin submitting solutions 114 by executing steps of the intent program 110, in any order which satisfies the dependencies specified by the intent declaration 106. Each step in the intent program can have a solution 114, which is provided by the solver 108*a*. When the solver 108*a* provides a solution 114 to a step, the solver 108*a* may include with it a step claim for the solution 114 of each of its dependencies. For example, the solver 108*a* may specify a block number and hash in which the dependency was satisfied on a corresponding blockchain, as well as the result of executing the step. The claims can be provided as input to a virtual machine of the intent engine 102 (e.g., virtual machine 136*a*), which can expose the claims to the intent program 110.

The intent declaration 106 can define a main program for each step. The main program for a given step can have a corresponding set of virtual machine instructions that may define the intent constraints. The main program for a given step can be executed by a virtual machine (e.g., virtual machine 136*a*) of the intent engine 102. The internal operation of the virtual machine that executes the main program for a given step can depend on the blockchain on which the step is executed, since different blockchains may have differing characteristics that cause the internal operation of the virtual machines thereon to function differently from one another. In some examples, the virtual machine can include "solve instructions" that invoke a solution 114. These solutions 114 can be programs that are created by the selected solver 108*a*, and when executed by the virtual machine can satisfy constraints set by the user 104 in the main program. After completing execution of the main program for a given step, the result can be recorded and/or emitted as an event.

In some examples, the intent program 110 may contain gaps. The selected solver 108*a* may add instructions in these gaps to complete the intent program 110. This process can be referred to as "templated program execution." Templated program execution can allow a user 104 to define an intent program 110 with partially specified operations, referred to as "templates," which the selected solver 108*a* can complete at execution time within strict boundaries set by the user 104. In this approach, the user 104 can create an intent program 110 containing one or more templates that specify the core structure of an operation (e.g., an external contract call, a transaction, or a data transfer) but intentionally leave certain fields (e.g., target addresses, token amounts, or calldata segments) open to be filled in by the selected solver 108*a*. During execution, the solver 108*a* is permitted to select among the available templates and supply the specific values for the designated fields, but only within the exact constraints and ranges defined by the user 104. The system 100 can enforce that the solver 108*a* cannot perform any additional or unauthorized operations, nor modify any aspect of the template outside the prescribed fillable segments. This can offer a flexible but secure way to delegate limited authority to the chosen solver 108*a*, while ensuring that every completed operation strictly conforms to the user's intent and the program's logic.

In some examples, the solver 108*a* may determine one or more services to execute based on the intent declaration 106 and/or other factors. This determination may be performed using artificial intelligence, heuristics, and/or other algorithms or techniques. For instance, the solver 108*a* may take as input the intent declaration 106 and implement the required changes in asset (e.g., token) balances at each step. In this process, the solver 108*a* may search through a list of available smart contracts or other services, potentially representing this list as a graph to facilitate efficient pathfinding and execution planning. The solver 108*a* may be capable of identifying multiple such services to be called simultaneously, parsing and simulating their function calls to evaluate the effect of each transaction. After determining a suitable sequence of services, function calls, and/or call data, the solver 108*a* can compile this information into a structured list of opcodes or instructions in other compatible languages, which can then be formatted as a solution 114 and submitted for execution by the intent engine 102.

Additionally or alternatively, a selected solver 108*a* may determine a sequence of services and functions to invoke based on the intent declaration 106 and/or other factors. The services may be on-chain services such as smart contracts or off-chain services. The solver 108*a* can simulate the effect of each function call on the target services, generate the necessary call data, and compile these into a list of opcodes or instructions in other compatible languages. This opcode list can then be formatted into a solution 114 and submitted for execution by the intent engine 102. In some examples, both of the above approaches may be combined, allowing for both sequential and parallel search and simulation, or hybrid methods as dictated by the complexity of the intent declaration and the available service landscape.

In some examples, the selected solver 108*a* may leverage an artificial intelligence (AI) model 118 such as a large language model (LLM). For instance, the solver 108*a* may provide the intent declaration 106, protocol schema, opcode schema, and/or specific instructions to a LLM, which may have access to tools for reading blockchain state and parsing smart contracts. The LLM can analyze this information, generate a candidate solution, and the solver 108*a* can format and submit the output as the proposed solution 114. In some examples, the AI model 118 may use heuristic methods (e.g., conditional logic, state space or graph search, neural networks, classifiers, and/or statistical analysis) to generate a list of opcodes (or instructions in other compatible languages) or a solution 114, which is then formatted and submitted to the intent engine 102. This approach can be used individually or in any combination with either of the foregoing approaches. In some examples, the solver 108*a* may further incorporate geographical, chronological, and/or personal identifying data as additional input parameters, enabling context-aware or user-tailored solutions 114.

Within the intent program 110, there can be two principal types of steps that can be solved: Solution Programs and Templated Program Execution. In the Solution Program paradigm, the solver 108*a* can provide a set of instructions (potentially of arbitrary length and complexity) written in the opcode schema of the intent declaration 106 or in another compatible language. When a step is to be solved, the intent engine 102 can replace the step in the intent declaration 106 with the solver-provided instructions. These solver-provided instructions may be executed by the intent engine 102 (e.g., one of its virtual machines 136*a-n*) in a separate memory environment from the main intent program 110 or within the same environment, with data passing between environments as necessary to ensure correct operation. This approach can enable broad and flexible programmatic solutions. For example, a solution program may orchestrate a complex, multi-step asset (e.g., token) swap across several blockchains 128*a-n*, automate recurring on-chain financial transactions, or coordinate cross-chain voting actions in a decentralized governance process.

By contrast, in Templated Program Execution, the intent declaration 106 includes a step which specifies a set of templates. Each of the templates may include elements, such as addresses, values, call data, and/or parameters. The parameters may indicate how to call the data, how the called data can be altered by the solver 108*a*, how data can be passed between a solver register space and a user register space of a virtual machine of the intent engine 102, etc. The solver 108*a* can select a template to solve and provide a set of instructions to solve the template. Each of the elements in the template may have their value provided by the intent declaration 106 or the solver 108*a*. When the intent declaration 106 is solved, the set of instructions provided by the solver 108*a* may be executed first. This execution may be conducted by the intent engine 102 (e.g., one of its virtual machines 136*a-n*) in the same memory environment or a different memory environment from the execution of the steps in the intent declaration 106. If executed in a different environment, data may be passed between this solver environment and the intent declaration environment. Following execution, any fields specified to be completed by the solver 108*a* can be filled out accordingly. If the template requires the solver 108*a* to alter call data, such modifications can be performed as prescribed. The completed template can then be executed by the intent engine 102. Additional instructions may be run before or after the template execution as needed. Templated execution can thus provide a secure, semi-structured mechanism for a user 104 to delegate limited authority to the solver 108*a* while ensuring strict conformance to user-defined boundaries.

Solution Programs and Templated Program Execution can be particularly broad in their application, as they enable solvers to address a wide array of complex, multi-step workflows spanning asset management, protocol upgrades, cross-chain arbitrage, automated compliance, and more. For example, a Solution Program may be used to rebalance a portfolio across decentralized exchanges, execute a liquidation process involving multiple collateral types, or perform bulk upgrades of smart contracts deployed on disparate chains, all based on a user's single high-level intent. With a solution program, the user 104 can specify the intended outcome and delegate orchestration of the solution program's execution to a solver 108*a*, which may be any type of agent (e.g., an AI agent). The agent can be strictly bound by the constraints and execution environment of the system 100, ensuring that the execution only fulfills the user's 104 specified intent or else fails, in which case the user 104 may recover any inputs provided.

Once an iteration of the intent program 110 is complete, the next iteration (if there are any remaining) may be determined according to parameters specified in the intent declaration 106. The time that the next solver selection process should end may also be determined according to parameters specified in the intent declaration 106. The solver selection process can proceed as it did for the previous iteration, either selecting a solver from the pool of solvers 108, or not.

By repeatedly applying the process above, every iteration number may have a time interval in which it is allowed to be run, and which may be deterministically computed. If user 104 proposes or the solver 108*a* submits a request for a declaration for which the parameters overflow the time interval bounds, the solver 108*a* may not be able to solve steps as of the iteration at which the overflow is triggered.

If an iteration of the intent program 110 fails due to the user 104, repetition may still be allowed. However, if an iteration fails to complete due to the solver 108*a* and according to certain parameters in the intent declaration 106, any further repetition of the intent program 110 may be denied. If there are gaps in the intent program 110, the solver 108*a* may claim that prior iterations have been skipped by submitting the appropriate claims to the single program wallet 134*a* for the intent program 110. To that end, the solver 108*a* can claim (and later prove, in order to release its stake) that a block on every blockchain where a step is to be run has a timestamp after the time interval of the last iteration which the solver 108*a* claims has been skipped, and that the iteration number on all such chains is the predecessor to the first one being skipped.

Solutions to the next iteration of the intent program 110 can be accepted by the intent engine 102 according to parameters in the intent declaration 106. There may be additional timing constraints on individual steps as well. The time boundaries for steps in each iteration of the intent program 110 can be similarly computed using the parameters for the intent program 110.

All steps in each iteration of the intent program 110 may need to be completed before the solver 108*a* is permitted to begin solving steps for a later iteration. It is possible for the same solver 108*a* to be selected for multiple iterations at once. In such a case, the solver 108*a* can prove that prior iterations are complete before beginning work on a new iteration.

After completing one or more steps of the intent program 110, the solver 108*a* can generate a proof of solution, and can transmit the proof of solution to one or more proof verifiers 116. A proof verifier 116 can be a smart contract (e.g., executed on a blockchain such as blockchain 128*a*) or another programmatic entity such as a software agent. The proof verifier 116 can be configured to validate the proof of solution by querying blockchain state, comparing hashes, and/or verifying the accuracy and timeliness of the execution. The proof verifier 116 can be identified by the user 104 in the intent declaration 106, and may be honored by the stake authority 124 to either unlock or slash the solver's 108*a* stake after verification. The possible mechanisms for validation include a simple signature, a multi-party signature, or program instructions (e.g. which verifies a ZK proof). The proof verifier 116 may be sufficiently staked itself, such that devaluing the network via validation of corrupt proofs may be less likely to happen.

Bounty hunters 120 can monitor the execution of the steps of the intent program 110 and can generate and transmit a proof of forgery to the proof verifiers 116 based on detecting suspected fraud or error. A bounty hunter can be a smart contract (e.g., executed on a blockchain such as blockchain 128*a*) or another programmatic entity such as a software agent. The bounty hunters 120 can, in exchange for a bounty paid out of the solver's stake, prove a solver 108*a* committed a fraud. The stake authority 124 may require the bounty hunters 120 to be staked to prevent griefing and other undesirable behavior.

Proof verifiers 116 can adjudicate the validity of proofs of solution and proofs of forgery, and can transmit a verification result to the intent engine 102 and/or the stake authority 124. Based on the verification result, the stake authority 124 can process stake operations, which can include releasing staked assets to the solver 108*a* or slashing stakes in the event of fraud or failure.

Some or all of the components in the system 100 can interact via one or more networks 112, including local area networks and the Internet, utilizing cryptographically secure messaging, digital signatures, cross-chain proofs, and event emissions to facilitate robust and deterministic execution of intent declarations 106. To enable coordination and data transfer between virtual machines 136*a-n* deployed across multiple blockchains 128*a-n*, the system 100 may employ secure cross-chain messaging protocols. These protocols can leverage established interoperability standards, such as Inter-Blockchain Communication (IBC), protocol-specific relayers, or custom bridges, to transmit dependency claims, execution proofs, and state changes between chains in a reliable and authenticated manner. By integrating such secure communication mechanisms, the system architecture can help ensure that workflows are coordinated in a decentralized, auditable, and verifiable manner, while remaining resilient against failure or malicious behavior.

Various components of system 100 may be provided by one or more computing devices 122, such as servers, desktop computers, laptop computers, tablets, smartphones, and Internet of Things (IoT) devices. For example, entities such as developers can utilize the computing devices 122 to receive, author, test, and/or refine one or more smart contracts that implement individual components of the system 100, such as the proof verifier 116, stake authority 124, solver selection authority 138, virtual machine 136*a*, solver 108*a*, and bounty hunter 120. The computing devices 122 can then submit the one or more smart contracts to one or more of the blockchains 128*a-n* for deployment. The underlying blockchain networks can receive, validate, and activate the smart contracts for execution. This process can enable the dynamic instantiation of system components across multiple blockchain environments.

Figure 2:
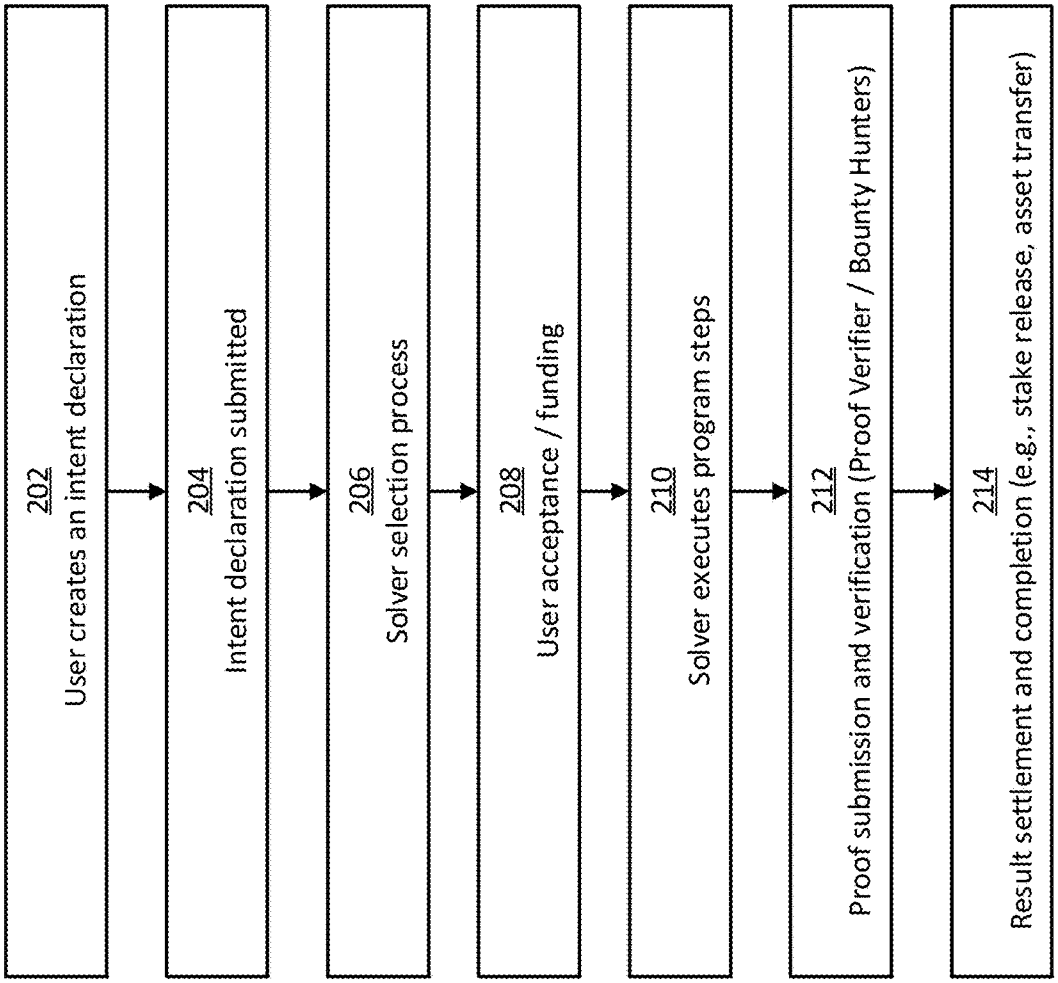
FIG. 2 flowchart of an example of the lifecycle of an intent program, according to some aspects of the present disclosure.

Turning now to FIG. 2, shown is a flowchart of an example of the lifecycle of an intent program, according to some aspects of the present disclosure. Other examples may involve more steps, fewer steps, different steps, or a different sequence of steps than is shown in FIG. 2.

In general, the lifecycle of an intent declaration 106 typically involves: construction and submission of the intent declaration 106, selection of a solver 108 to generate solutions 114 for the corresponding intent program 110, execution of intent program 110 on-chain by the intent engine 102, program iteration, and verification and settlement.

As noted above, the intent engine 102, solvers 108, bounty hunters 120, solver selection authority 138, stake authority 124, proof verifiers 116, and other system components may be implemented as distributed smart contracts, off-chain services, or hybrid entities, and may be deployed across multiple blockchain environments. Each of these system components can play a specific role: the intent engine 102 can enforce intent declaration constraints and provide execution guarantees, the solver selection authority 138 can select the solver 108 for an intent declaration 106 and ensure the solver 108 is staked, the bounty hunter 120 can prove solver fraud, the stake authority 124 can hold and manages staked assets, and the proof verifier 116 can validate proofs of completion, forgery, or failure.

Beginning now at step 202, a user 104 can create an intent declaration 106, which can specify a desired outcome, a set of constraints, and/or one or more program steps. The user 104 may draft the intent declaration 106 and can include templates or gaps for later completion by a solver 108.

At step 204, the user 104 can submit the intent declaration 106 to the system 100. The system 100 can receive, validate, and/or register the intent declaration 106, and can initiate asset deposits or pre-execution checks as needed. In some examples, the intent declaration 106 can be received at the solver selection authority 138. In response to receiving the intent declaration 106, the solver selection authority 138 can initiate a solver selection process. Alternatively, the intent declaration 106 can be received at another component of the system 100, which can respond to the receipt of the intent declaration 106 by communicating with the solver selection authority 138 to initiate the solver selection process.

At step 206, the solver selection authority 138 can initiate a solver selection process. The solver selection authority 138 can evaluate the pool of solvers 108 based on user preferences, protocol rules, and/or other criteria such as cost, speed, or solver reputation. The solver selection authority 138 can select a solver **108*a* and may ensure that the solver 108 is staked with the stake authority 124 for the duration of a verification window. The verification window can be the window of time for which the solver 108 may have its stake locked with the stake authority 124** to participate in solving intent programs. When the verification window ends, the program may enter the default failure state if no other terminal state has been reached.

The architecture of the solver pool and selection process confers significant technical improvements over traditional static or centralized execution models. By dynamically matching solvers to intent declarations based on protocol- and user-defined criteria, the system can enable highly parallelized and distributed processing, which allows computational workloads to be efficiently balanced across available solver resources. This adaptive allocation reduces bottlenecks and minimizes the risk of overloading any single node, resulting in improved throughput and lower latency for complex, multi-step workflows. The explicit staking and verification window mechanisms may further optimize memory and bandwidth usage by bounding the temporal scope of resource commitments, ensuring that only active, relevant solver state is retained and reducing unnecessary persistence of stale or expired bids.

Additionally, by recording solver selection, staking, and request/response activity directly on-chain (e.g., rather than relying on off-chain coordination or repeated polling), the protocol can minimize redundant network messaging and enable compact, deterministic tracking of solver assignments and workflow progress. This event-driven architecture may also facilitate efficient querying and auditing, as all relevant state transitions can be accessed via predictable, indexed data structures without requiring full transaction log traversal. In aggregate, these improvements support scalable, resilient, and resource-efficient execution of decentralized workflows, enabling the system to handle high volumes of concurrent intent programs with minimal processing overhead and optimal use of protocol bandwidth and memory.

At step 208, the system can await the acceptance and provision of any required input necessary for execution of the intent program 110. This process may encompass explicit or implicit actions by one or more users (e.g., user 104) depending on the workflow design. In some examples, the progression to program execution is conditioned on the production or commitment of requisite assets, authorizations, and/or data by a user to the single program wallet (SPW) associated with the intent program 110. This step typically serves as the operational equivalent of "accepting" a proposed solution or "funding" the intent program 110 by a user, and may involve, for example, digitally signing a transaction, depositing tokens or other assets into the SPW, or otherwise furnishing inputs specified by the intent declaration 106 or by the selected solver **108*a*. While some examples may require a direct user action, such as a signature or explicit confirmation, other examples may treat the submission of the necessary assets or credentials as an implicit acceptance of the selected bid or solution. The system may be configured to verify that the SPW has received the required assets, permissions, and/or data before allowing subsequent steps to be executed. This may help ensure that execution is contingent upon the user's clear consent and the satisfaction of all preconditions specified in the intent declaration 106**.

At step 210, the selected solver **108*a* can execute program steps to generate solutions 114 based on the intent declaration 106. The solver 108*a* can interact with the intent engine 102 (e.g., one or more of its virtual machines 136*a-n*) to perform operations such as asset transfers, smart contract interactions, or bridging across chains. The solver 108*a* can interface with the virtual machines 136*a-n* to interpret and execute program logic. The solver 108*a*** can fill in permitted template fields using external data, heuristics, and/or AI-driven methods, while adhering to any user-defined constraints.

The solver **108*a* may use AI models, heuristics, graph search, and/or simulation to determine a solution 114 for each step of the intent program 110, and may submit solutions to some or all of the virtual machines 136*a-n* of the intent engine 102 as structured opcode lists. The solver 108*a* may also provide solution programs (e.g., arbitrary length instruction sets) or fill templates (e.g., with specific, limited modifications) as required by the intent declaration 106 to the virtual machines 136*a-n*** for execution.

At step 212, after program execution, the solver **108*a* can submit a proof of solution 114 to proof verifiers 116. The proof verifiers 116 can receive the proof of solution 114 from the solver 108 and can query blockchain state, verify transaction hashes, and/or check event logs to confirm the accuracy of execution. Bounty hunters 120 can independently monitor execution and can submit a proof of forgery to the proof verifiers 116 in response to identifying a suspected fraud. Proof verifiers 116 can adjudicate submitted proofs and can transmit a verification result to the intent engine 102 and/or the stake authority 124**.

The system 100 can allow various types of proofs. Examples of such proofs may include proof of success (all step claims are true and the solver **108*a* fulfilled the iteration), proof of partial completion (some step claims are true, none are false, and the solver 108*a* forfeited the iteration), proof of forgery (at least one step claim is false), and proof of failure (no step claims are false, but the solver 108 failed to forfeit or fulfill the iteration). Proofs may be verified by the proof verifiers 116 via on-chain queries, and the stake authority 124 can act accordingly by unlocking, slashing, or refunding the solver's stake, or awarding bounties to bounty hunters 120**.

The claims made by the solver **108*a* may be accepted optimistically, but may be refuted by any bounty hunter 120, within the verification window. If the solver 108***a* is proven to have provided false information at any time within the verification window, they are subject to slashing (and blacklisting). The amount slashes may depend on various factors. For example, the solver 108*a* may be subject to slashing up to the total insurance value specified in the intent declaration 106, plus a bounty to be paid to the bounty hunter 120 who provides the proof of forgery. A proof of success may also be submitted by the solver 108*a* to the proof verifier 116, which upon verifying the proof of success, can close the verification window early. Proofs may be submitted to the proof verifier 116, and the stake authority 124 may respect the decision of the proof verifier 116 as to the validity of proofs, which in turn determines when and to whom stakes are released.

If the selected solver 108*a* does not complete all steps of a particular iteration of the intent program 110, the protocol can nevertheless allow the solver 108*a* to unlock and recover portions of its staked assets associated with those steps that were successfully executed. To enable such partial settlement, the solver 108*a* may, in some examples, finalize the status of all unexecuted or skipped steps by issuing one or more step finalization commands for each such step. As used herein, a step finalization command is any standardized instruction recognized by the intent engine 102 and the virtual machines 136*a-n*, which serves to formally indicate the disposition of a step that remains uncompleted at the end of the solver's execution window. Step finalization commands may include, for example, a "no-op" (no operation) command—which explicitly marks a step as intentionally bypassed or left incomplete without further operation—as well as other protocol-defined instructions that may represent cancellation, deferment, explicit abandonment, or other permissible status changes for an unexecuted step.

In response to determining that one or more steps will remain uncompleted, the solver 108*a* can generate and submit appropriate step finalization commands for each such step to the intent engine 102. The intent engine 102, in turn, can record these finalization events within the single program wallet 134*a* associated with the intent program 110. Each step finalization command can be logged as a distinct event in the program's execution record, thereby explicitly marking the disposition of the corresponding step (whether as intentionally skipped, deferred, or otherwise finalized according to protocol rules). This process can ensure that steps left unexecuted are unambiguously recognized and distinguished from those that might otherwise result in error states or require further adjudication.

Following the submission of all relevant step finalization commands, the solver 108*a* may be required to formally forfeit its rights to any fees, rewards, or other compensation for the incomplete iteration. This forfeiture can be implemented by the solver 108*a* invoking a designated forfeit function on the single program wallet 134*a*, which irreversibly relinquishes the solver's claim to compensation for that iteration. The invocation of this function updates the program state, enabling the protocol to trigger a re-auctioning process for the incomplete iteration. Through re-auctioning, the protocol may solicit bids from additional candidate solvers to complete any remaining unexecuted steps, thereby maximizing the likelihood of overall program completion and preserving the workflow continuity established by the user's intent declaration.

Once the step finalization commands have been processed and forfeiture has been completed, the solver 108*a* may submit a "proof of partial success" to the stake authority 124. This proof sets forth a verifiable execution record, identifying which steps were successfully performed and which were finalized using step finalization commands (e.g., no-op, cancellation, or deferment). The proof of partial success is subject to validation by the protocol's proof verifiers 116, which may query blockchain state, verify event logs, and adjudicate the accuracy of the solver's claims. Upon successful verification, the stake authority 124 can release the portion of the solver's staked assets corresponding to the completed steps, while retaining or reallocating any remaining stake in accordance with the protocol's rules governing completion, forfeiture, and re-auctioning.

If the solver 108*a* does not forfeit or fulfill the iteration by the time the iteration expires, and if none of the solver's 108*a* claims are false, the iteration may be considered a failure. A proof of failure may be provided during the verification window to release the solver's 108*a* entire stake to the program owner. After the verification window ends, the iteration is considered a default failure, which is essentially the same state, but no proof is needed for the stake to be claimed by the owner of the intent program 110. At step 214, based on the verification result, the system 100 can perform result settlement and completion. For example, the stake authority 124 can release or slash the solver's stake, and the single program wallet 134 can transfer assets or update program state. The intent engine 102 can update the status of the intent declaration 106, emit notifications, and/or initiate any further program iterations or post-execution auditing.

Figure 3:
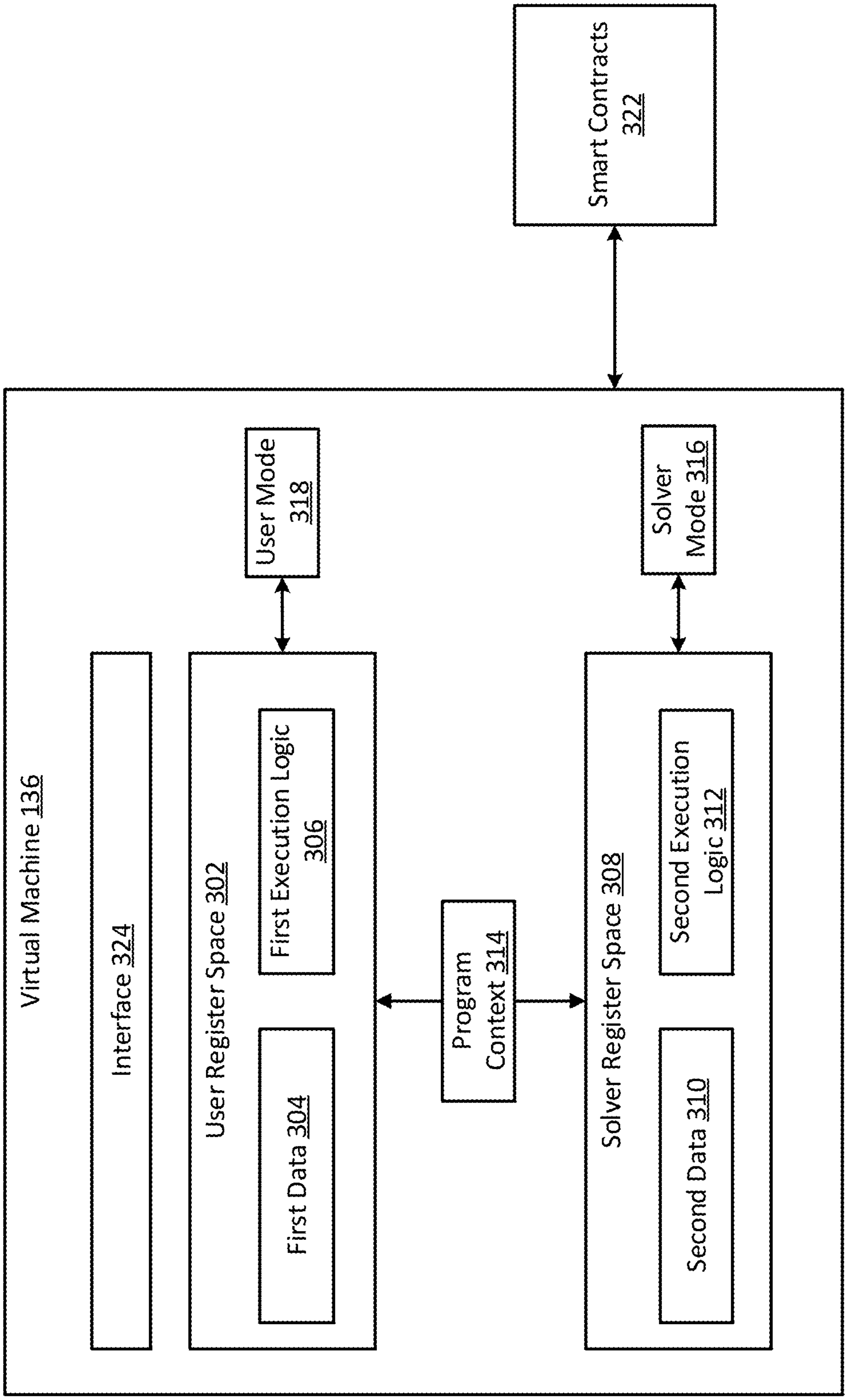
FIG. 3 shows a block diagram of an example of a Vertex Virtual machine with register spaces and execution modes, according to some aspects of the present disclosure.

Turning now to FIG. 3, shown is a block diagram of an example of a virtual machine 136 with register spaces and execution modes, according to some aspects of the present disclosure. The virtual machine 136 can be a specialized computing engine that interprets and executes user-defined intent programs specifying complex, multi-step operations across one or more blockchains. The virtual machine 136 can manage execution of the intent declarations by loading instructions, handling memory and state, and coordinating the flow between user-specified and solver-specified logic. This enables the automated and verifiable completion of sophisticated blockchain workflows without requiring users to submit multiple manual transactions or interact directly with several blockchains.

The virtual machine 136 can include an interface 324 which may allow users (e.g., users and programs) to interact with the intent engine 102 via dashboards, APIs, or LLM-based frontends.

The virtual machine 136 can include a user register space 302 and a solver register space 308, which can be distinct memory regions or storage areas. This separation ensures that roles and responsibilities are clearly divided during intent program execution. The user register space 302 can store and process data (e.g., first data 304 and first execution logic 306) related to the main intent program. The solver register space 308 can be reserved for second execution logic 312 and second data 310 introduced by the solver that helps fulfill the user's intent. This architecture allows the virtual machine 136 to securely delegate complex operations to qualified solvers, while enabling the user to define which data or constraints are shared with the solver.

The virtual machine 136 can operate in at least two execution modes: a user mode 318 and a solver mode 316. In user mode 318, the virtual machine 136 can execute the first execution logic 306 with access to the full instruction set and all user register space 302 contents. In solver mode 316, the virtual machine 136 can execute the second execution logic 312, but only a restricted subset of instructions may be available, and only the solver register space 308 may be accessed. The program context 314 can mediate transitions between user mode 318 and solver mode 316 based on program flow, template boundaries, and/or validation needs. The virtual machine 136 can enforce execution rules and restrict certain operations based on the current mode, whether user mode or solver mode, to ensure that only authorized actions are performed and that the user's intent is consistently preserved throughout the process.

The virtual machine 136 can employ robust and programmable error handling, using distinct fault modes to determine how the virtual machine 136 responds to execution errors. In user fault mode, errors that occur during the user's portion of a program can be trapped and reported back. This allows for safe handling and debugging without disrupting the entire process. In solver fault mode, errors during solver execution may result in a complete or partial reversion of the relevant operation. This can protect both the user and the virtual machine 136 from unintended or malicious solver behavior. These fault-handling mechanisms, together with event emission and a flexible instruction set, can provide a reliable and transparent environment for executing decentralized, cross-chain operations based on user intent.

The virtual machine 136 can operate by interpreting instructions in a defined sequence. In some examples, the virtual machine 136 is capable of dynamically selecting among different instruction sets, tailoring its behavior to the requirements and conventions of the underlying blockchain environment. For example, the VM may automatically detect whether it is operating within the Solana, Ethereum, or another blockchain ecosystem, and accordingly load and execute the instruction set or opcode schema specific to that environment. This automatic determination can ensure that the virtual machine 136 interprets and processes instructions in a manner that is compatible with the unique architecture, data structures, and execution semantics of the target blockchain. By supporting multiple instruction sets, the virtual machine 136 can enable seamless, cross-chain execution of intent programs, allowing users and solvers to interact with heterogeneous blockchain protocols through a unified system interface.

The virtual machine 136 can use a program context 314 to keep track of execution state, the current instruction pointer, and/or the memory registers allocated to the user and the solvers. When a user's intent program is executed, the virtual machine 136 can initialize a user register space 302 of configurable size, preload it with required data and dependency claims, and process the set of instructions specified by the user. These instructions may include storage operations, conditional checks, external calls to smart contracts, and/or event emissions. Solver programs can be loaded into the separate solver register space 308. This ensures that data and logic provided by the solver cannot affect the user's program state unless explicitly permitted. Isolating registers in this way helps maintain security and correctness. It can allow only the intended data to be shared between the user and solver and ensure that program execution is both deterministic and auditable.

The instruction set available in the virtual machine 136 can support a variety of programmable operations, such as calls to external smart contracts 322, data manipulation, conditional branching, and/or the construction or parsing of complex data structures such as tuples. Each instruction may be represented by an opcode, which is a coded identifier that specifies the operation to be performed. The virtual machine 136 can use opcode handlers to decode the instruction arguments and manage their execution according to strict rules. The virtual machine 136 may support both immediate and register-based versions of call instructions, which gives users and solvers flexibility in invoking external functionality. The virtual machine 136 can also enforce mode-specific constraints. For example, in user mode, the complete instruction set may be available, while in solver mode, certain instructions such as delegate calls or event emissions may be disabled to prevent solvers from executing unauthorized actions. This careful delineation of allowable operations, together with programmable transitions between user and solver fault modes, provides a robust and extensible foundation for executing intent-driven, cross-chain workflows with detailed control over state, access, and error handling.

In some examples, the virtual machine 136 can include a specialized instruction called "Solve_Templated," which is designed to give users fine-grained control over how solvers fulfill portions of an intent program while maintaining strict security and correctness guarantees. With Solve_Templated, the user can define a set of templates 320 that represent specific external calls or operations, each with certain fields or data ranges left intentionally incomplete. During execution, the solver is permitted to select from among these templates and fill in only the specified portions, such as addresses or calldata, according to constraints established by the user. The virtual machine 136 can enforce that no unauthorized external calls are made by the solver during this process and that all modifications are limited to the ranges explicitly allowed by the template. This approach can help ensure that solvers can provide necessary dynamic inputs (e.g., up-to-date prices or addresses) without being able to deviate from the user's intended logic or introduce malicious behavior. By combining template selection, controlled data filling, and strict execution mode restrictions, Solve_Templated can provide a flexible and secure mechanism for handling dynamic, intent-driven workflows.

Through the above features, the virtual machine 136 can support secure, extensible, and auditable execution of complex intent programs, providing programmable isolation of user and solver logic, strict enforcement of templates and constraints, and seamless integration with external smart contracts and blockchains. The architecture of the virtual machine 136 yields several technical advantages and improvements over conventional blockchain execution models. By separating user and solver register spaces and providing distinct execution modes, the virtual machine 136 enables fine-grained control over access permissions and instruction sets, which enhances security by preventing unauthorized interactions between user and solver code. This isolation also facilitates modular development and robust error handling, allowing faults in solver logic to be contained without compromising the integrity of the user's intent program. Furthermore, the virtual machine's 136 ability to dynamically select and load instruction sets tailored to the underlying blockchain environment allows for true cross-chain programmability, making it possible to execute heterogeneous workflows spanning multiple protocols from a unified programming interface. The programmable enforcement of templates and declarative constraints can ensure that even sophisticated, multi-party workflows can be automated without sacrificing determinism or auditability. Collectively, these architectural improvements enable developers and users to author, deploy, and manage highly customized, secure, and interoperable blockchain programs that would be prohibitively complex or error-prone to execute using traditional smart contract paradigms.

Figure 4:
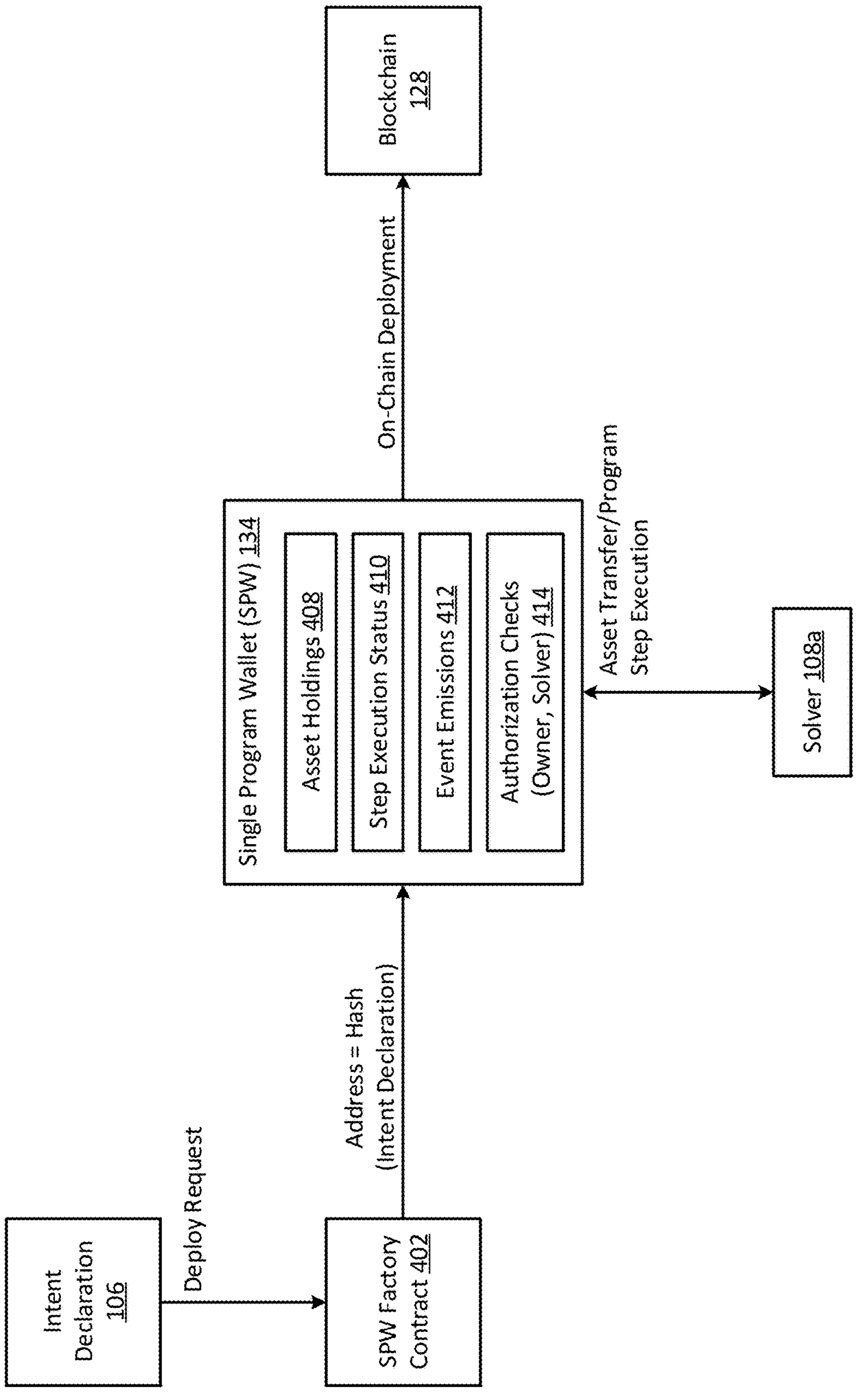
FIG. 4 shows an example of the deployment and operation of a single program wallet, according to some aspects of the present disclosure.

FIG. 4 shows an example of the deployment and operation of a single program wallet (SPW) 134, according to some aspects of the present disclosure. The single program wallet 134 can be an instance of a smart contract that is deployed on a blockchain 128 and used for secure custody, state management, and/or event recording during execution of an intent program. The single program wallet 134 can be deployed on the blockchain 128 based on the intent declaration 106 being submitted by the user. For example, in response to receiving the intent declaration 106, the system can call a SPW factory contract 402 which can deploy the single program wallet 134 on the blockchain 128. A "factory contract" is a specialized smart contract designed to automate the deployment of other smart contracts in a predictable, standardized manner.

When deploying the single program wallet 134 on the blockchain 128, the SPW factory contract 402 can deterministically compute an address for the single program wallet 134. For example, the SPW factory contract 402 can determine an address for the single program wallet 134 based on a cryptographic hash of the intent declaration 106. In this way, the single program wallet 134 can be cryptographically linked to the specific intent program. This can ensure that its location is predictable, unique, and unambiguously associated with one and only one intent program. The SPW factory contract 402 can then deploy the single program wallet 134 on the blockchain 128 at the computed address, thereby ensuring a unique and predictable association of the single program wallet 134 with the intent declaration 106.

Once deployed, the single program wallet 134 can enforce valid state transitions, manage assets or state associated with the intent program, and/or serve as the on-chain authority for accepting actions, verifying signatures, and/or recording the results of each step of the intent program. Once created, the single program wallet 134 can hold any funds, tokens, and/or other assets 408 required for the execution of the intent program and act as the anchor for that intent program on the blockchain 128.

The single program wallet 134 can be tightly integrated with the broader protocol architecture. For example, the single program wallet 134 can work in conjunction with the intent engine (e.g., its virtual machines) to process and validate program steps, communicate with the intent engine to enforce program constraints and solver selection, and serve as the interface through which solvers submit solutions and verifiers check proofs. This can ensure that only authorized actions, corresponding to the user's intent and solver's authorized solutions, can be performed on behalf of the intent program.

The single program wallet 134 can also play a central role in the lifecycle and security model of the intent system. For example, the single program wallet 134 can maintain a mapping of step indices to their execution status 410, track which iterations of the intent program have been completed, and/or emit events 412 that record dependency claims, solution variables, and the results of each completed step. The single program wallet 134 can ensure that only the correct solver (e.g., as determined by an authorized bid and the current iteration) may execute a given step. The single program wallet 134 can also ensure that all necessary conditions are satisfied before any state is updated or assets (e.g., tokens) are released. Examples of such conditions can include proof of completion, signature verification, and adherence to timing and funding constraints. By serving as the central point of coordination for intent program execution on each chain, the single program wallet 134 can help enable decentralized enforcement of program logic, secure custody of the intent program's assets, and transparent record-keeping for cross-chain workflow activity.

The solver 108*a* can interact with the single program wallet 134 by submitting transaction requests to execute steps, transfer assets, and/or update state. The single program wallet 134 can verify that the solver 108*a* is authorized to perform an operation; can enforce timing, funding, and/or proof-of-completion requirements; and can approve or reject operations accordingly. The single program wallet 134 can verify that the solver 108*a* is authorized to perform an operation based on a digital signature, an explicit delegation or authorization in the intent declaration 106, or on-chain verification.

The single program wallet 134 can interface with the intent engine to process and validate steps. The single program wallet 134 can also communicate with the intent engine 102 to enforce constraints and solver selection. The single program wallet 134 may further serve as the interface for solution submission and proof verification. The single program wallet 134 can emit events for some or all significant transitions, helping to provide transparency and auditability.

The single program wallet 134 may be accessed by the user, the owner, or any other party expressly designated in the intent declaration. While the user, owner, or other defined entities may interact directly with the single program wallet 134 on-chain, they may also delegate or assign specific operations to be executed or orchestrated by another party, such as the solver 108*a*. In particular, the system can support a function (referred to as "CallBySig") whereby the invoker of an operation supplies the owner's digital signature as authorization for the call data to be processed by the single program wallet 134. Under this model, the solver 108*a* or another authorized party may be the entity that actually invokes functions on the single program wallet 134, but only pursuant to the explicit authorization of the owner, as demonstrated by the attached signature and verified via an authorization check 414. In some examples, the authority to transact, manage assets, and/or initiate operations through the single program wallet 134 can originate from the intent declaration, ensuring that all actions are either directly or indirectly authorized by the owner. While anyone may be able to invoke the single program wallet's 134 core functionality with the proper authorization, the signature check can help ensure that only those actions pre-approved by the owner or intent declaration are permitted to execute.

Additionally, in some examples, the system can be designed to enhance user safety and asset recoverability across blockchains by defining a set of addresses for the single program wallet 134 across some or all of the supported blockchains, not just those explicitly used in the intent program. As a result, if a user inadvertently funds an SPW address on a blockchain that is not active in the current workflow, the user may still control that address and retain the ability to recover or withdraw those funds. This provides robust protection against accidental deposits and ensures that the owner's authority and recoverability extend to all associated SPW instances, regardless of their explicit invocation within a given program.

Through the above features, the single program wallet 134 can provide secure, transparent, and decentralized management of program assets and state, enabling robust execution of complex workflows across one or more blockchains 128. The architecture of the single program wallet 134 can afford multiple technical improvements over traditional solutions, particularly with respect to processing efficiency, memory utilization, and protocol bandwidth. By deploying each SPW deterministically and linking it to a specific intent declaration, the system enables highly targeted asset and state management, thereby minimizing unnecessary on-chain storage and reducing lookup and verification overhead. The SPW's fine-grained mapping of step execution status and program state can allow smart contracts and off-chain agents to query, update, or verify program progress using compact and predictable data structures, which can improve both read and write efficiency and reduces the risk of storage bloat. From a processing perspective, the SPW's native support for atomic, multi-step operations can allow complex workflows to be executed and validated in a single transaction or small set of coordinated calls, minimizing redundant computation and eliminating the need for cross-contract polling or repeated state synchronization. By localizing program logic, asset custody, and execution metadata within discrete, purpose-built smart contract instances, the SPW model can reduce the overall system footprint, streamline protocol interactions, and support high-throughput, concurrent execution of multiple independent workflows. This can deliver material improvements in scalability, resource consumption, and network-level performance over generalized, monolithic wallet or escrow designs.

Figure 5:
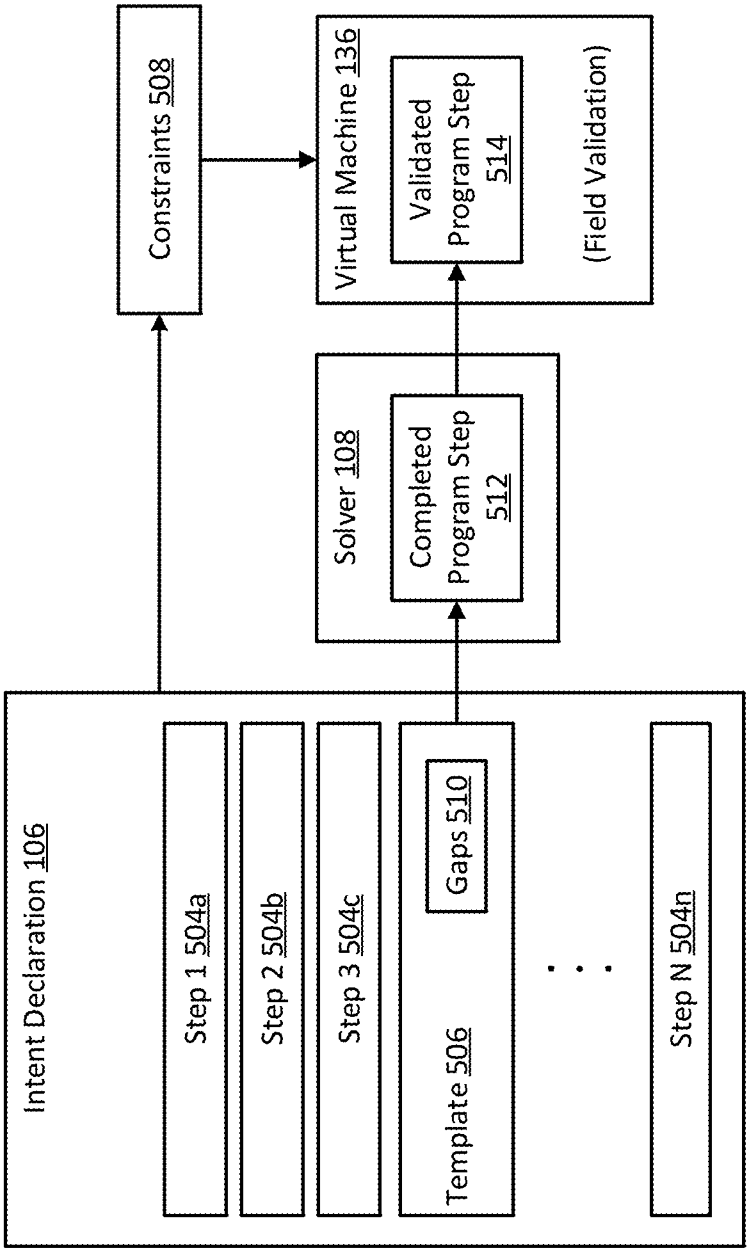
FIG. 5 shows an example of templated program execution, according to some aspects of the present disclosure.

FIG. 5 shows an example of templated program execution, according to some aspects of the present disclosure. Templated program execution can enable users to delegate completion of specific program steps to solvers 108, while maintaining strict control over allowed modifications. A user-defined intent declaration 106 can include a sequence of steps 504*a*, 504*b*, 504*c*, through 504*n*, with one or more steps specified as templates 506 containing gaps 510 (e.g., incomplete fields).

Constraints 508 can specify the permissible values, ranges, and/or formats for each gap 510, including allowed addresses, amounts, and/or calldata. The constraints 508 can be predefined by the user and may be included in the intent declaration 106. During execution, a solver 108 can receive the intent declaration 106, identify template steps 506, and supply values for permitted fields. The supplied values may be determined by the solver 108 using real-time data, simulation, and/or AI-driven heuristics. The solver 108 can submit completed program steps 512 to the virtual machine 136, which can validate that the filled fields conform to constraints 508 and that no unauthorized modifications are made.

The virtual machine 136 can execute additional instructions before or after template completion, manage state transitions, and/or enforce all boundaries. Upon successful validation, the virtual machine 136 can generate a validated program step 514. The virtual machine 136 can execute the validated program step 514 and can update state, transfer assets, and/or emit events as specified.

Figure 6:
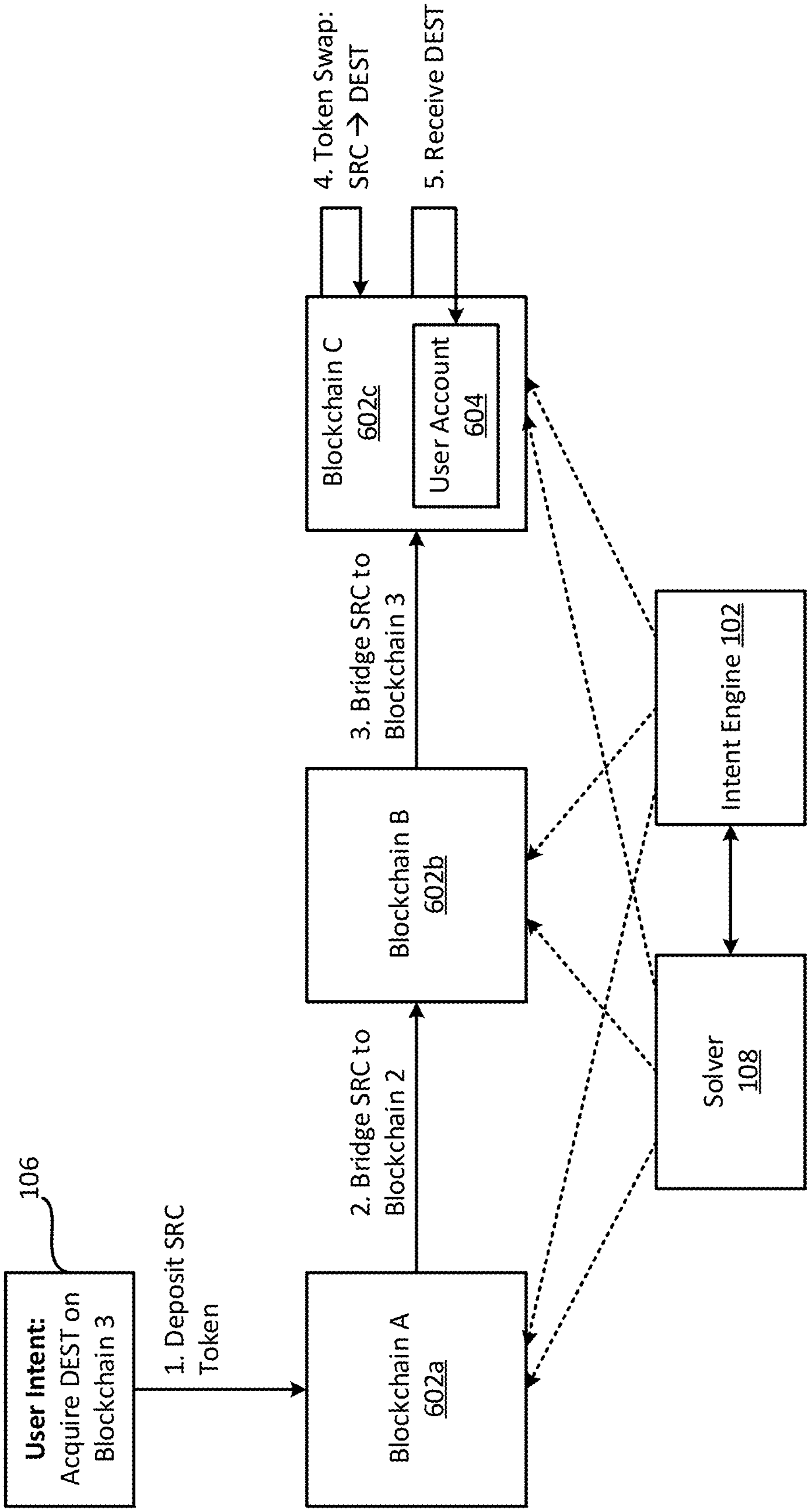
FIG. 6 shows an example of a cross-chain workflow associated with an intent program, according to some aspects of the present disclosure.

FIG. 6 shows an example of a cross-chain workflow associated with an intent program, according to some aspects of the present disclosure. The process can be initiated by a user, which can seek to acquire DEST tokens on a destination blockchain 602*c*, starting with SRC tokens on blockchain 602*a*. The user can create an intent declaration 602 specifying the desired outcome and relevant constraints, such as minimum DEST amount or execution deadline.

The intent engine 102 can receive the intent declaration 106, broadcast a request for solutions to solvers. The solvers can analyze the intent declaration 106 and propose solution submissions that outline a sequence of steps to achieve the target outcome. The selected solver 108 can instruct the user to deposit SRC tokens on blockchain 602*a*. The solver 108 can then orchestrate a bridge operation, transferring the SRC tokens from blockchain 602*a* to blockchain 602*b*. Upon successful bridging, the solver 108 can initiate a second bridge operation to move the SRC tokens from blockchain 602*b* to blockchain 602*c*. Asset custody and state updates can be managed by one or more SPWs, such as SPW instances on each blockchain.

After the SRC tokens arrive on blockchain 602*c*, the solver 108 facilitates the execution of a swap operation to acquire DEST tokens in exchange for the SRC tokens. In some examples, the solver 108 may not directly execute the swap itself. Instead, the solver 108 sources the swap execution from a third-party venue, such as a decentralized exchange (DEX), centralized exchange (CEX), or other external liquidity provider or protocol capable of performing the asset conversion. The solver 108 may select the most appropriate or advantageous third-party source based on criteria specified in the intent declaration (e.g., price, slippage, or settlement speed) and may submit the swap transaction or route the SRC tokens to the chosen venue for completion of the swap. Upon successful execution of the swap by the third-party source, the resulting DEST tokens are received into the relevant program-controlled wallet (e.g., the single program wallet or a designated user wallet) on blockchain 602*c*. The solver 108 may then arrange for the DEST tokens to be transferred, as specified in the intent program, to the user account 604 on blockchain 602*c*, thereby completing the workflow.

Throughout this process, the solver 108 can act as an orchestrator and coordinator, ensuring that the swap is executed in accordance with user-defined constraints and programmatic instructions. The intent engine 102 can coordinate and monitor execution of the intent program, ensuring that each step is performed according to the intent declaration 106 and user-defined constraints. The single program wallet 134 can manage asset custody and state tracking across the involved blockchains 602*a-c*.

Based on completing the workflow, the solver 108 can submit a proof of solution to proof verifiers 116. The proof of solution can demonstrate that each step was successfully executed and that the user account 604 received the intended asset. The proof verifiers 116 can validate the proof and can transmit a verification result. The stake authority 124 can process the verification result, releasing or adjusting the solver's staked assets based on the result.

Based on this process, the system 100 can automate complex, multi-chain workflows, enabling seamless asset movement and program execution across heterogeneous blockchain environments, all underpinned by secure, verifiable, and intent-driven coordination among system components. Some examples of other workflows that can be implemented by the system 100 are described below.

Asset Abstraction for SRC: Asset abstraction is the concept of unifying asset balances (e.g., tokens) across multiple different blockchains. For example, if a user's token balance is fragmented over five different blockchains, then managing payments using the fragmented balance can be very tedious. If a user wants to buy a DEST token worth 100 SRC on a chain where the user's balance is zero, but the user has enough SRC split over three chains to complete the purchase, then the user may first need to bridge all three SRC balances over to the chain on which the user would like to complete the DEST purchase, and then also execute another transaction to complete the DEST purchase. Instead, the user can describe an intent program that will handle the asset transfers and DEST purchase with the user only requiring one click. With this functionality, the system abstracts away the SRC balance on the frontend and intelligently selects the best (e.g., cheapest, fastest, etc.) routes to making balance transfers and purchasing DEST that will create the intent program declaration for a user to sign. The user may create and submit the following intent program: Pay for DEST on BC1 using SRC on BC2, BC3, and BC4.

Claim Token Award: A cross chain protocol may award tokens on multiple chains that include multiple steps including a deposit before a user can redeem the tokens. An intent can be used to satisfy all requirements and claim token awards across multiple chains. The user may create and submit the following intent program: Collect award after donating to token guild on BC1, moving SRC from BC2 to BC3, and claiming the award.

Prevent Liquidation: An intent can be created to monitor a loan position. Using conditional intents, when the loan position is close to being undercollateralized, the intent can refill the position to prevent liquidation.

Liquidate Underwater Accounts: An intent may be used to liquidate other accounts.

Upgrade Programs: Cross-chain protocols may have many of the same programs deployed on multiple chains. As their reach increases, they may manage their programs on hundreds of chains. Upgrading is one particular example where they may need their proxy programs to all point to a new version of the program on all the different chains. Usually this would involve individually upgrading each program, but with intent programs, the protocol can manage the upgrade process in a much easier fashion. They can submit an intent program consisting of a series of call intents that perform the upgrade and only need to sign once. The user may create and submit the following intent program: Upgrade programs on BC1, BC2, and BC3.

Token Subscriptions: Intent programs can support a subscription service to schedule recurring transfers for a user. The user can define an intent program that can perform balance transfers across chains and have them scheduled to execute periodically for a set number of iterations, until a set time, or indefinitely depending on the service. The user may create and submit the following intent program: Year-long monthly subscription to service.

Universal deposit and conversion: An end user can be permitted to deposit any amount and type of cryptocurrency, with the intent of receiving a specified output token (e.g., USDC on the Base blockchain) irrespective of the input asset. The user merely declares their desired outcome (e.g., "deliver Base USDC to my account"), and the system, via a solver, orchestrates the necessary bridging, swapping, and routing steps across all supported blockchains and protocols to maximize the delivered amount of the target token. For example, the solver can evaluate all possible conversion routes (e.g., using real-time on-chain data and liquidity sources) and may optimize for criteria such as lowest slippage, fastest settlement, or minimal fees. This workflow abstracts away the complexity of manual cross-chain transactions from the user, enabling seamless interoperability between disparate assets and chains while ensuring that the user receives the most favorable execution possible for their specified target asset.

Multiple token acquisition: A user may wish to obtain a diversified set of tokens (e.g., 70% BTC and 30% ETH) or a portfolio mirroring the allocations of a reference wallet. The user can specify either the desired portfolio allocation or a reference wallet, and the system can construct an intent program that automates all requisite bridging, swapping, and allocation steps. The solver (e.g., leveraging its access to cross-chain liquidity and pricing data) may determine the optimal sequence of transactions to convert the user's desired asset mix into the target portfolio, executing those steps in a coordinated and efficient manner.

Automated trading: Some examples can support the creation of automated, on-chain trading or investment strategies. These may be similar to user-defined exchange-traded funds (ETFs). In this model, a user may define an intent to automatically execute trades that track the activity or asset allocation of another wallet, or to follow a predefined basket of tokens with specified weighting and periodic rebalancing. For example, a user could instruct the system to mirror the trades of a well-known, publicly visible wallet or to maintain a dynamic portfolio that reacts to market events. The solver can continuously monitor the target portfolio or wallet, automatically executing bridging, swapping, and allocation steps across multiple chains as needed to replicate the desired asset composition.

Splitting large orders: Some examples can support splitting large orders across multiple blocks on a single blockchain using the intent program architecture. For example, an institutional investor seeking to execute a substantial trade (e.g., such as a million-dollar purchase or sale of a digital asset) may wish to avoid significant market slippage and adverse price movement that often results when large orders are executed in a single transaction. Using an intent declaration, the investor can specify that the order is to be split into a sequence of smaller transactions (e.g., ten $100,000 orders), with each transaction to be executed in a separate block or at specified intervals. The system can then orchestrate the stepwise execution of each sub-order as an individual step within the intent program, leveraging its virtual machine infrastructure to enforce timing, sequencing, and conditional execution constraints. Solvers may be used to source optimal execution venues for each tranche, monitor real-time liquidity, and ensure that each order is filled at or better than a user-defined price threshold. By distributing the total order volume in this manner, the system can enable users to mitigate slippage, minimize market impact, and take advantage of transient liquidity opportunities, all while maintaining a unified audit trail and programmatic verification across the entire multi-step execution.

Automatic reinvestment: The system may also support sophisticated automation of asset management and distribution flows, including automatic reinvestment of dividends or yield, as well as programmable "mail forwarding" of incoming funds based on asset type and/or origin. For example, a user may define an intent program instructing the system to automatically reinvest any received yield or dividends (e.g., staking rewards or airdrops) back into the originating asset, a target portfolio, or a yield-generating strategy. As another example, a merchant or asset manager may specify that all incoming USDC earnings be routed to Wallet A, while any ETH receipts are to be automatically forwarded to Wallet B. This flexible routing can be further extended to use cases such as automated tax withholding, where a predefined portion of every incoming payment is programmatically set aside for tax obligations, or to proactive savings, charitable giving, or expense management. The system's intent engine and templated program execution capabilities can enable users to encode these distribution rules declaratively, with solvers responsible for monitoring incoming funds, executing required swaps or transfers, and ensuring that funds are allocated or reinvested according to the user's logic and constraints. This approach can provide a robust, auditable, and highly customizable framework for automating complex asset flows and financial operations across multiple blockchains.

Other use cases may include delegating votes without delegating and conditional program for future cross-chain transfer.

Figure 7:
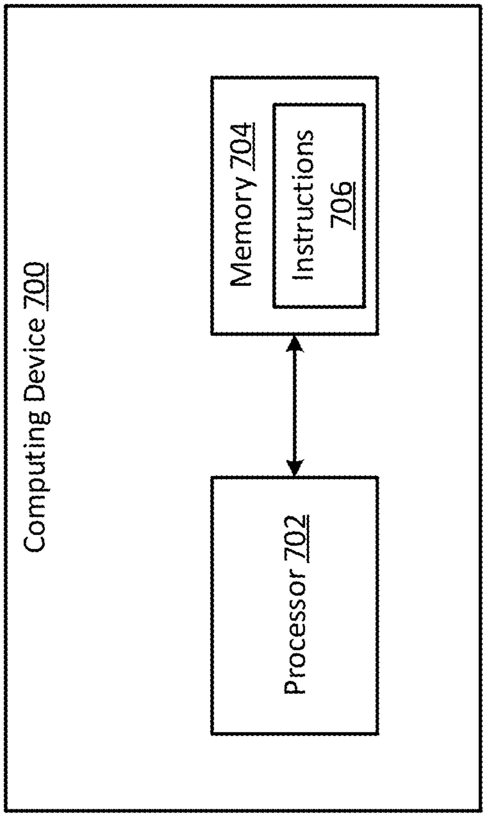
FIG. 7 shows a block diagram of a computing device usable to implement some aspects of the present disclosure.

Turning now to FIG. 7, shown is a block diagram of an example of a computing device 700 usable to implement some aspects of the present disclosure. The computing device 700 may be used to implement any functionality or combination of functionality described above.

The computing device 700 can serve as an example of any of the computing devices or computing nodes described herein. For example, the computing device 700 can correspond to a computing node of a blockchain network, where the computing node may be used to implement a blockchain and/or a component of the system 100 (e.g., virtual machine 136, proof verifier 116, stake authority 124, solver selection authority 138, solver 108*a*, and/or bounty hunter 120). As another example, the computing device 700 may correspond to a computing device used by the user 104 to submit the intent declaration 106. As still another example, the computing device 700 may correspond to a computing device 122 used by a developer to deploy a component of the system 100.

As shown, the computing device 700 includes a processor 702 communicatively coupled to a memory 704. The processor 702 may include one or more processing devices. Examples of the processor include a Field-Programmable Gate Array (FPGA), an application-specific integrated circuit (ASIC), a microprocessor, or any combination of these. The processor can execute instructions 706 stored in the memory 704 to perform operations. The instructions 706 can include processor-specific instructions generated by a compiler or an interpreter from code written in any suitable computer-programming language, such as C, C++, C#, Python, or Java. In some examples, the instructions 706 can be configured to implement the functionality of the virtual machine 136, proof verifier 116, stake authority 124, solver selection authority 138, solver 108*a*, and/or bounty hunter 120.

The memory 704 can include one memory device or multiple memory devices. The memory 704 can be volatile or non-volatile. Examples of the memory 704 include electrically erasable and programmable read-only memory (EEPROM), flash memory, or any other type of non-volatile memory. At least some of the memory device includes a non-transitory computer-readable medium from which the processor can read the instructions 706. A computer-readable medium can include electronic, optical, magnetic, or other storage devices capable of providing the processor with computer-readable instructions or other program code. Examples of a computer-readable medium can include magnetic disks, memory chips, ROM, random-access memory (RAM), an ASIC, a configured processor, optical storage, or any other medium from which a computer processor can read the instructions 706.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium storing program code that is executable by one or more processors for causing the one or more processors to perform operations, wherein the operations include:

receiving an intent declaration submitted by a user, wherein the intent declaration defines one or more steps of a workflow to be performed across multiple blockchains;

initializing a user register space and a solver register space as separate memory regions of a virtual machine;

loading first data and first execution logic specified in the intent declaration into the user register space;

loading second data and second execution logic contributed by a solver in fulfillment of the one or more steps into the solver register space; and executing an intent program corresponding to the intent declaration within a context of the virtual machine, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

2. The non-transitory computer-readable medium of claim 1, wherein the operations further include:

automatically detecting an underlying blockchain protocol associated with the blockchain; and loading a specific instruction set or opcode schema associated with the underlying blockchain protocol for use in executing the intent program.

3. The non-transitory computer-readable medium of claim 1, wherein the operations further include:

restricting available instructions and register access when the solver mode is active.

4. The non-transitory computer-readable medium of claim 1, wherein the operations further include:

validating a completed template field submitted by the solver, wherein the completed template field is generated by the solver by filling in an empty field of the intent declaration.

5. The non-transitory computer-readable medium of claim 1, wherein the program code is implemented as a smart contract executable on the blockchain.

6. The non-transitory computer-readable medium of claim 1, wherein the operations further include:

coordinating execution of the intent program across the multiple blockchains by communicating with at least one other virtual machine deployed on at least one other blockchain, such that at least one step of the intent program is executed with respect to the blockchain on which the virtual machine operates and at least one other step of the intent program is executed on the at least one other blockchain.

7. The non-transitory computer-readable medium of claim 1, wherein the operations further include:

interfacing with a single program wallet deployed on the blockchain, wherein the single program wallet is a smart contract, the interfacing comprising:

transmitting execution requests and solution data corresponding to steps of the intent program to the single program wallet;

receiving authorization or validation signals from the single program wallet to confirm that the solver is permitted to execute the steps; and updating an execution status of each step of the intent program within the single program wallet by recording completion, failure, or dependency satisfaction events, such that the single program wallet maintains an auditable mapping of intent program progress.

8. The non-transitory computer-readable medium of claim 1, wherein the operations further include:

interfacing with a single program wallet deployed on the blockchain, wherein the single program wallet is a smart contract, the interfacing comprising:

coordinating asset transfers or state changes via the single program wallet in response to successful execution of the steps of the intent program, including releasing or locking of digital assets; and communicating with the single program wallet to synchronize program state, facilitate proof verification, and ensure that actions taken by the virtual machine are authorized in accordance with constraints defined in the intent declaration and enforced by the single program wallet.

9. The non-transitory computer-readable medium of claim 1, wherein the first data and the first execution logic include user-specified variables, constraints, and step instructions.

10. A system comprising:

a memory;

a processor coupled to the memory, wherein the processor is configured to receive an intent declaration submitted by a user, and wherein the intent declaration defines one or more steps of a workflow to be performed across multiple blockchains; and a virtual machine associated with a blockchain of the multiple blockchains, wherein the virtual machine is configured to perform operations including:

initializing a user register space and a solver register space as separate memory regions of the virtual machine;

loading first data and first execution logic specified in the intent declaration into the user register space;

loading second data and second execution logic contributed by a solver in fulfillment of the one or more steps into the solver register space; and executing an intent program corresponding to the intent declaration, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

11. The system of claim 10, wherein the operations further include:

automatically detecting an underlying blockchain protocol associated with the blockchain; and loading a specific instruction set or opcode schema associated with the underlying blockchain protocol for use in executing the intent program.

12. The system of claim 10, wherein the operations further include:

restricting available instructions and register access when the solver mode is active.

13. The system of claim 10, wherein the operations further include:

validating a completed template field submitted by the solver, wherein the completed template field is generated by the solver by filling in an empty field of the intent declaration.

14. The system of claim 10, further comprising a smart contract configured to deploy the virtual machine.

15. The system of claim 10, wherein the operations further include:

coordinating execution of the intent program across the multiple blockchains by communicating with at least one other virtual machine deployed on at least one other blockchain, such that at least one step of the intent program is executed with respect to the blockchain on which the virtual machine operates and at least one other step of the intent program is executed on the at least one other blockchain.

16. The system of claim 10, wherein the operations further include:

interfacing with a single program wallet deployed on the blockchain, wherein the single program wallet is a smart contract, the interfacing comprising:

transmitting execution requests and solution data corresponding to steps of the intent program to the single program wallet;

receiving authorization or validation signals from the single program wallet to confirm that the solver is permitted to execute the steps; and updating an execution status of each step of the intent program within the single program wallet by recording completion, failure, or dependency satisfaction events, such that the single program wallet maintains an auditable mapping of intent program progress.

17. The system of claim 10, wherein the operations further include:

interfacing with a single program wallet deployed on the blockchain, wherein the single program wallet is a smart contract, the interfacing comprising:

coordinating asset transfers or state changes via the single program wallet in response to successful execution of the steps of the intent program, including releasing or locking of digital assets; and communicating with the single program wallet to synchronize program state, facilitate proof verification, and ensure that actions taken by the virtual machine are authorized in accordance with constraints defined in the intent declaration and enforced by the single program wallet.

18. The system of claim 10, wherein the first data and the first execution logic include user-specified variables, constraints, and step instructions.

19. The system of claim 10, wherein the virtual machine is part of an intent engine that includes multiple virtual machines across multiple blockchains.

20. A method comprising:

submitting, by a processor, a smart contract for execution in relation to a blockchain, wherein the smart contract is executable to cause a virtual machine associated with the blockchain to perform operations, the operations including:

initializing a user register space and a solver register space as separate memory regions of a virtual machine;

loading first data and first execution logic specified in an intent declaration into the user register space, wherein the intent declaration defines one or more steps of a workflow to be performed across multiple blockchains;

loading second data and second execution logic contributed by a solver in fulfillment of the one or more steps into the solver register space; and executing an intent program corresponding to the intent declaration, wherein executing the intent program involves transitioning between a user mode and a solver mode based on a program context, wherein the user mode causes the virtual machine to execute the first execution logic loaded into the user register space, and wherein the solver mode causes the virtual machine to execute the second execution logic loaded in the solver register space.

* * * * *